April 16, 1946. R. A. HARTMAN 2,398,374
FASTENING DEVICE
Filed Jan. 8, 1945
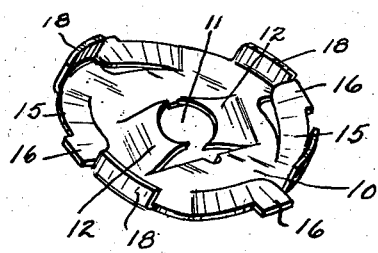
FIG. 1
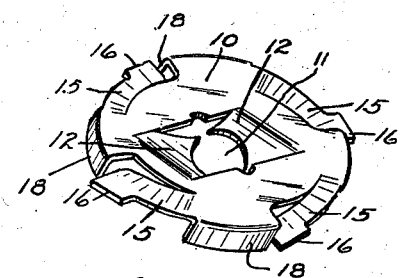
FIG. 2
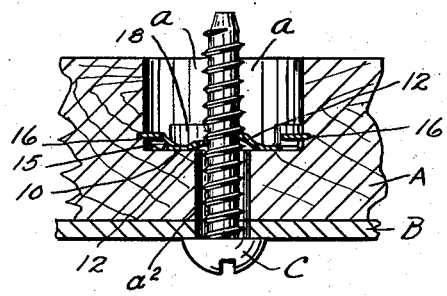
FIG. 6
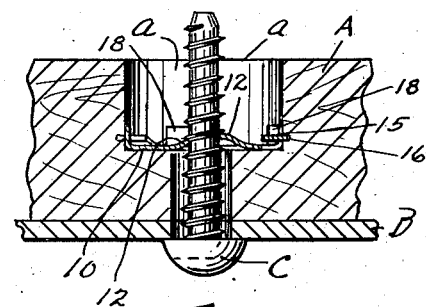
FIG. 5
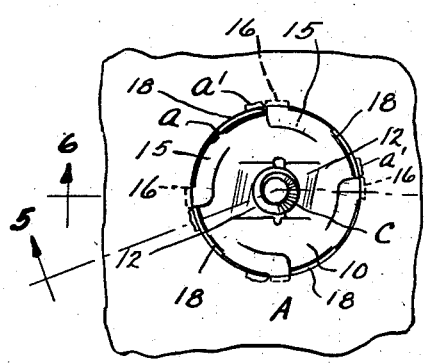
FIG. 3
FIG. 4
INVENTOR.
RICHARD A. HARTMAN
BY
Bates, Teare & McLean
ATTORNEYS Patented Apr. 16, 1946

2,398,374

UNITED STATES PATENT OFFICE 2,398,374

FASTENING DEVICE

Richard A. Hartman, Cleveland, Ohio, assignor to Tinnerman Products, Inc., Cleveland, Ohio, a corporation of Ohio Application January 8, 1945, Serial No. 571,788

10 Claims. (Cl. 85—36)

This invention relates to a fastening device comprising a washer-like member having thread-engaging means, adapted to coact with the thread of a bolt passing through a support, and having means to engage such support to prevent the rotation of the member.

The self-locking nut provided by this invention is especially adapted for mounting on a support of wood or other material in which projecting portions of the device may readily embed themselves, and it is an object of the invention to provide a very simple washer-like self-locking thread engaging fastener for this or similar purposes. Another object of the invention is to provide a thread-engaging washer which may be readily mounted on a counterbored opening in the support and coact with the wall of such opening to prevent rotation of the fastener as the bolt is turned into it. A further object of the invention is to provide a thread-engaging washer which may be easily positioned at the top of a counterbore to be drawn into the counterbore by a bolt and which washer will be arranged to coact with the wall of the counterbore as it is forced therein in such manner as to center the washer and to prevent it from tilting and to prevent the washer from either tilting or rotating when a bolt is turned into it.

My self-locking washer is illustrated in the drawing hereof and hereinafter more fully described, and the essential novel characteristics are set out in the claims.

In the drawing, Fig. 1 is a top perspective of my fastening device; Fig. 2 is a bottom perspective thereof; Fig. 3 is a plan on a smaller scale of the fastening device in position in a recess in the support; Fig. 4 is a cross section illustrating the fastening device positioned in the support prior to the insertion of a bolt therein, the plane of the section being substantially the same as that of Fig. 5; Figs. 5 and 6 are cross sections showing the mounted fastening device, these sections being taken on the correspondingly numbered lines on Fig. 3.

The fastening device, as shown in the drawing comprises a disc-like member 10 of resilient sheet material preferably spring steel, having a central bolt opening 11. The material of the fastener is deformed about this opening to provide a thread-engager. This deformation comprises, in the form shown, a pair of tongues 12 which are partially severed from the body of the fastener and bent upwardly therefrom at opposite acute angles and oppositely warped to define a turn of a helical thread. Thus, this portion of a fastener acts as a nut for a bolt passing through the opening 11.

At the margin of the disc-like member I form arcuate tongues 15 which are partially severed from the member, as shown, and bent upwardly at acute angles thereto, each arcuate member having a portion 16 projecting outwardly beyond the general contour of the member. As shown in the drawing there are four of these arcuate tongues, though the number may be varied if desired. They are preferably equi-distant and all extend in the same circumferential direction from their regions of anchorage to the body of the fastener.

The periphery of the disc-like member is also provided with upstanding arcuate lips 18 which are bent upwardly at right angles from the body of the member. As illustrated in the drawing there are four of these lips, though the number may be varied if desired. The lips 18 are preferably equi-distant from each other and are disposed between the tongues 15.

In Figs. 3, 4, 5 and 6, I have indicated at A a wooden support adapted to receive and carry the fastener and I have shown at B a plate to be clamped to such support by a threaded bolt C passing through the plate and support into the fastener. A counterbored or cylindrical well $a$ is formed in the support, the diameter of which is only slightly longer than that of the diameter of the body of the fastener.

In mounting the fastener in a counterbore one merely places a fastener over the well of the counterbore as indicated in Fig. 4. The fastener is then forced axially into the counterbore with a suitable tool such as indicated by the dotted lines D in Fig. 4, until the body of the fastener is seated on the base of the counterbore. As the fastener is forced into the well the arcuate tongues 16 score the wall of the well, as indicated at $a'$ in Fig. 3, so that from the start the fastener firmly attaches itself to the support. When the fastener has been seated in the well it is twisted slightly by the tool which engages the side walls of the tongues 12.

The upstanding lips 18 which rise from the body of the fastener, fit the counterbore with reasonable snugness and therefore center the fastener with the bolt opening $a$—2 and prevent tilting of the fastener while it is being forced into the counterbore.

By carrying the projections 16 on the ends of the yielding tongues 15, I also provide a certain amount of latitude in the engagement of the projections on the tongues with the wall of the support. The tongues may play back or up slightly if an especially hard portion of the support is encountered as the fastener is being seated, while the body of the fastener will be prevented from tilting due to the guide lips 18.

After the fastener has been seated in the counterbore the plate B is positioned and the threaded bolt C is turned into place. The projections 16 prevent turning of the fastener and the guide lips 18 prevent tilting of the fastener while the bolt is being tightened.

The fastener may be very cheaply constructed and it has been found to be very effective for the purpose intended, acting as a nut for the bolt without the necessity of employing any wrench or other external means to hold the fastener.

I claim:

1. A fastener in the form of a substantially circular plate having an opening and carrying a thread-engager about the opening, the margin of the plate being formed with a partially severed arcuate tongue etxending peripherally and having an outward portion adapted to seat in the wall of a counterbore in a support for the fastener.

2. A fastening device comprising a member of resilient sheet material having a bolt opening, material of the fastener about the opening being deformed to provide a thread-engager, and tongues at the margin of the member partially severed therefrom and having their major portions within the perimeter of the member and having comparatively short projections adjacent their free ends extending beyond the general perimeter of the member.

3. A fastening device comprising a disc-like member of resilient sheet material having a central bolt opening, the material of the fastener being deformed about the opening to provide a thread-engager, and a plurality of arcuate tongues at the margin of the fastener, said tongues being partially severed from the body of the fastener and anchored thereto at one end, the tongues being inclined from their region of anchorage and at their free ends having outward projecting portions.

4. A fastening device comprising a disc-like member of resilient sheet material having for the most part a circular periphery and having a central bolt opening, the material of the fastener about the opening being deformed to form a thread-engager for a bolt passing through the opening, and a plurality of arcuate tongues at the margin of the fastener partially severed therefrom and extending in circumferential direction, the free ends of the tongues projecting outwardly beyond the general periphery of the fastener.

5. A fastening device comprising a disc-like member of resilient sheet material having for the most part a circular periphery, and having a central bolt opening, the material of the fastener about the opening being deformed to form a thread-engager for a bolt passing through the opening, a plurality of equi-distant arcuate tongues at the margin of the fastener partially severed therefrom and extending in the same general circumferential direction and each inclined at an acute angle to such body, the free ends of the tongues being formed to project outwardly beyond the general periphery of the fastener.

6. A fastening device comprising a resilient sheet metal member having a bolt opening, and carrying an internal thread-engager about the opening and tongues at the margin of the member inclined in the same circular direction as the internal edge of the thread-engager and extending outwardly beyond the general perimeter of the member.

7. A fastening device comprising a disc of resilient material having a central bolt opening and deformed about the opening to provide a helical thread, said disc having arcuate tongues at its margin extending outwardly beyond the general periphery of the disc and inclining from the body of the disc in the same circular direction as the deformed internal thread-engager.

8. A fastening device comprising a plate-like member having a bolt opening and deformed upwardly about the opening to provide thread-engaging means, the fastener having within its margin a relatively movable tongue carrying a projection extending outwardly beyond the general perimeter of the fastener, said fastener having also at its margin an upwardly extending guiding portion.

9. A fastener in the form of a plate having a central opening and carrying a thread-engager about the opening, the margin of the plate being formed with a plurality of partially severed arcuate tongues each having an outward portion, the margin also being arcuately flanged between said tongues out of the general plane of said plate.

10. A fastening device comprising a substantially circular member of resilient sheet material having a central bolt opening, a pair of opposed integral tongues partially severed from the body of the fastener, being anchored thereto at their distant ends and bent upwardly at opposite acute angles and warped in opposite direction to provide a helical turn making a thread-engager, a plurality of arcuate tongues at the margin of the fastener, said arcuate tongues being partially severed from the body of the fastener and anchored thereto at one end, the tongues being inclined from their region of anchorage in the same arcuate direction as the warping of said opposed tongues and at their free ends having comparatively short outward projecting portions, and a plurality of arcuate edge flanges interspersed with the arcuate tongues and extending upwardly substantially normal to the general plane of said circular member, the outer surface of said edge flanges defining a circle of less diameter than the circle defined by the outer edges of said projecting portions.

RICHARD A. HARTMAN.